(12) United States Patent
Kraemer et al.

(10) Patent No.: US 11,716,346 B1
(45) Date of Patent: Aug. 1, 2023

(54) PRIORITIZATION AND REMEDIATION OF COMPUTER SECURITY ATTACKS

(71) Applicant: Sysdig, Inc., San Francisco, CA (US)

(72) Inventors: Noah Kraemer, Moraga, CA (US); Omer Azaria, San Francisco, CA (US)

(73) Assignee: Sysdig, Inc., San Francisco, CA (US)

( * ) Notice: Subject to any disclaimer, the term of this patent is extended or adjusted under 35 U.S.C. 154(b) by 0 days.

(21) Appl. No.: 17/898,171

(22) Filed: Aug. 29, 2022

(51) Int. Cl.
*H04L 29/00* (2006.01)
*H04L 9/40* (2022.01)

(52) U.S. Cl.
CPC ...... *H04L 63/1433* (2013.01); *H04L 63/0876* (2013.01)

(58) Field of Classification Search
CPC .............. H04L 63/1433; H04L 63/0876
See application file for complete search history.

(56) References Cited

U.S. PATENT DOCUMENTS

| | | | | |
|---|---|---|---|---|
| 7,278,163 B2* | 10/2007 | Banzhof | ............ | H04L 63/1433 717/173 |
| 8,201,257 B1* | 6/2012 | Andres | ................ | G06F 21/568 726/25 |
| 8,676,746 B2* | 3/2014 | Tsai | .................... | G06F 11/0727 707/758 |
| 8,769,412 B2* | 7/2014 | Gill | ....................... | G06F 21/577 709/224 |
| 9,692,778 B1* | 6/2017 | Mohanty | .............. | G06F 21/577 |
| 10,841,337 B2* | 11/2020 | Kinder | ................ | H04L 63/1433 |
| 11,470,106 B1* | 10/2022 | Lin | ....................... | G06K 9/6256 |
| 2014/0173738 A1* | 6/2014 | Condry | ................. | G06F 21/577 726/25 |
| 2014/0214610 A1* | 7/2014 | Moshir | .............. | G06Q 20/4016 705/26.35 |
| 2015/0350174 A1* | 12/2015 | Reno | ................... | H04L 63/1433 726/25 |
| 2015/0350234 A1* | 12/2015 | Reno | ....................... | H04L 67/02 726/25 |
| 2018/0062941 A1* | 3/2018 | Brown | ................ | H04L 41/5032 |
| 2019/0164224 A1* | 5/2019 | Hunter | ................... | G06Q 40/04 |

(Continued)

FOREIGN PATENT DOCUMENTS

WO WO-2020227335 A1 * 11/2020 ........... G06F 21/552

*Primary Examiner* — Don G Zhao
(74) *Attorney, Agent, or Firm* — Kim & Stewart LLP

(57) ABSTRACT

Techniques for categorizing and prioritizing security issues is disclosed. A security management system is implemented to receive security events describing potential security issues from clients. The security events contain attributes describing the security issue, affected resources, and a risk score defining a level of security risk associated with the event. The security events may be aggregated into a set of recommendation categories based on the type of security issue to be remedied. Aggregated risk scores may be computed for each of the recommendation categories. The security management system causes displaying of a graphical user interface to display information representing the set of recommendation categories. User input may be received selecting a particular recommendation category. In response to selecting the particular recommendation category, recommendation instruction options are displayed for remedying the events within the particular recommendation category.

20 Claims, 6 Drawing Sheets

(56) References Cited

U.S. PATENT DOCUMENTS

| | | | | |
|---|---|---|---|---|
| 2019/0319971 A1* | 10/2019 | Levy | ............... | H04L 63/1441 |
| 2020/0252423 A1* | 8/2020 | Hogg | ............... | H04L 63/1433 |
| 2021/0336984 A1* | 10/2021 | Roytman | ............ | H04L 63/1433 |
| 2022/0129990 A1* | 4/2022 | Roudaut | ............ | H04L 63/1433 |
| 2022/0164472 A1* | 5/2022 | Cannon | ............. | G06F 21/6245 |
| 2022/0237071 A1* | 7/2022 | Wong | ............... | G06F 11/0793 |
| 2022/0327431 A1* | 10/2022 | Braviner | ............ | G06Q 40/06 |

\* cited by examiner

PRIORITIZATION AND REMEDIATION OF COMPUTER SECURITY ATTACKS

FIELD OF THE DISCLOSURE

The present disclosure relates to identifying, prioritizing, and remediating computer security issues. More specifically, the present disclosure relates to prioritizing computer security issues and providing a remedy to fix the identified computer security issues.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Clustered application environments are often used to run an array of software products. Clustered servers may run multiple instances of software applications running at the same time. One of the benefits of implementing a clustered server is the ability to scale up when demand requires additional processing resources. Managing resources in a clustered application environment typically requires extensive monitoring of software applications, and hardware resources. Many clustered application environments may implement containers and container images to run the desired software. A container is a standard unit of software that packages up code and its dependencies so that the application may be able to run in any computer environment.

Monitoring services provide a way to monitor various components of a clustered application environment, including applications running within containers and any other software or hardware resources used by components of the clustered application environment. The monitoring services may identify potential security issues within the clustered application environment and present the potential security issues to authorized users for remediation. However, complex clustered application environments may contain numerous computer security issues ranging in severity and type. The number of security issues identified within clustered application environments may overwhelm the authorized users who may need proper guidance on which security issues should be remedied first as well as understanding how to efficiently remedy the volume of security issues. It would be helpful to provide efficient prioritization and organization of the volume of security issues present in the clustered application environments.

DETAILED DESCRIPTION

Figure 1:
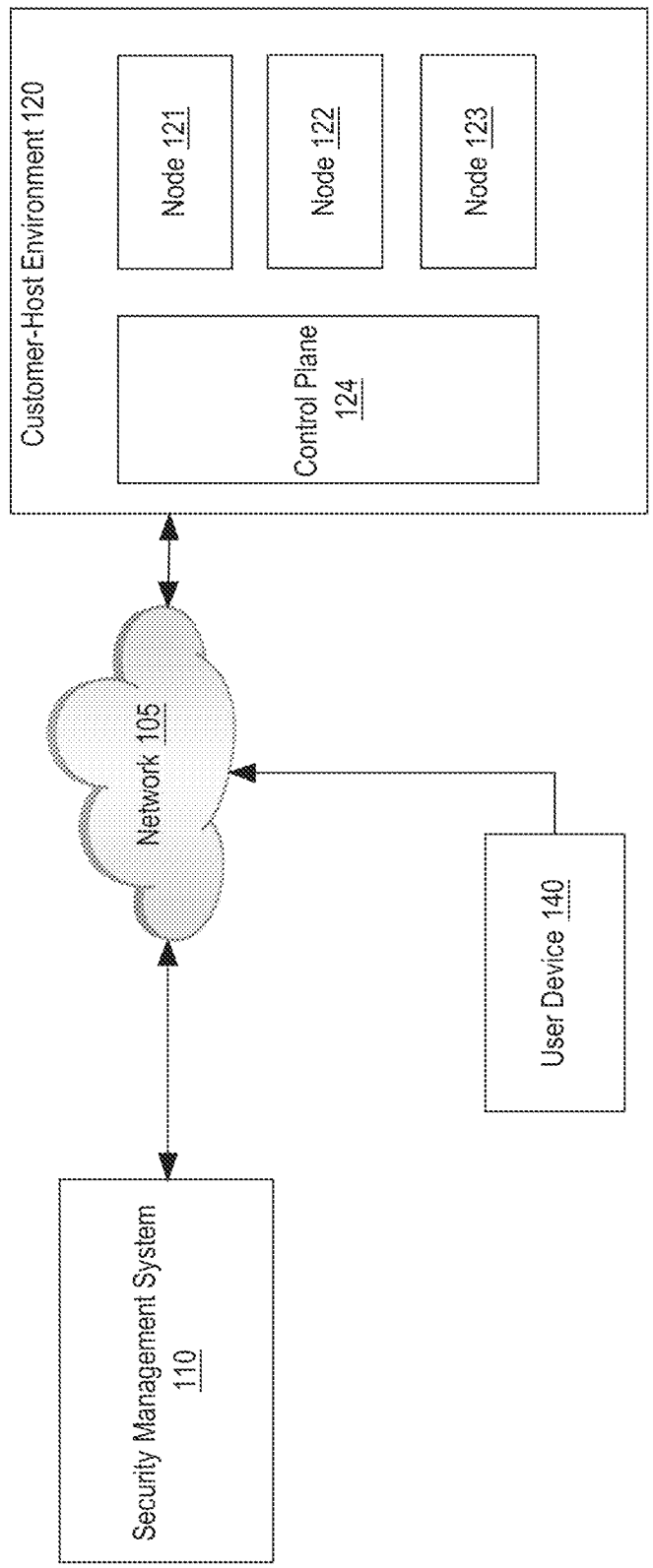
FIG. 1 is a diagram illustrating an example of a deployed customer-host environment and a security management system implemented to monitor various aspects of the deployed customer-host environment, in an embodiment.

In the following description, for the purposes of explanation, numerous specific details are set forth in order to provide a thorough understanding of the present disclosure. It will be apparent, however, that the present disclosure may be practiced without these specific details. In other instances, well-known structures and devices are shown in block diagram form in order to avoid unnecessarily obscuring the present disclosure. Modifiers such as "first" and "second" may be used to differentiate elements, but the modifiers do not necessarily indicate any particular order.

Embodiments are described herein according to the following outline:
  1.0 General Overview
  2.0 Structural Overview
  3.0 Functional Descriptions
    3.1 Client Receiving Services
    3.2 Security Events
    3.3 Security Processing Server
      3.3.1 Security Event Processing
      3.3.2 Recommendation Category Scoring
      3.3.3 Security Presentation
  4.0 Procedural Overview
  5.0 Implementation Example—Hardware Overview
  6.0 Extensions and Alternatives

1.0 GENERAL OVERVIEW

A security management system for collecting, categorizing, prioritizing, and presenting security issues related to a clustered application environment is disclosed. The security management system is programmed or configured to receive a plurality of security events via one or more of its client components. Client components may refer to client receiving services implemented to receive messages from one or more agents deployed within a client's deployment. The client components may generate a plurality of security events that represent potential security issues to be remedied. Each security event received can include attributes describing the type of security issue to be remedied, one or more resources affected by the security issue, and a risk score defining a level of security risk associated with the event.

In some embodiments, the security management system aggregates the plurality of security events for one or more of a set of recommendation categories based on the type of security issues to be remedied. Each recommendation category is then associated with a group of events that have the same type of security issue. The recommendation category represents a remediation path or a set of steps that may be performed to remedy the type of security issue related to the group of events. For example, security issues related to users not rotating their passwords may be grouped into a recommendation category for rotating passwords. For the purposes of this disclosure the terms recommendation and recommendation category may be used interchangeably. In some embodiments, presentation of the recommendation categories for a specific requesting user may be dynamically tailored to the requesting user's access privileges, where the recommendation categories are based on events that the specific requesting user has privileges to view or remedy.

In some embodiments, the security management system computes aggregated risk scores for each recommendation category. The aggregated risk score is an aggregation of the individual risk scores associated with each event within a specific recommendation category. By computing aggregated risk scores for the recommendation categories, the recommendation categories may be prioritized based on the overall risk level associated with a recommendation category. The security management system causes display of a graphical user interface on a user device for displaying information representing the set of recommendation categories. The set or recommendation categories displayed are prioritized for security issues that the requesting user has privileges to remedy.

In some embodiments, the security management system may receive user input selecting a particular recommendation category. In response to receiving the user input, the security management system may generate recommendation instructions to remedy the security issues within the recommendation category. In some embodiments, the graphical user interface generated by the security management system may contain action buttons, which when selected automatically trigger executing instructions to remedy one or more security issues within a recommendation category.

The security management system improves security monitoring and remediation in a complex containerized cloud-computing platform by categorizing security issues based on the type of security issue and dynamically prioritizing the security issues based on the relative severity of the security issues. The severity may be determined from the risk level, the amount of remediation effort, or other attributes of a security issue. The different types of security issues may pertain to different aspects of an account of the containerized cloud-computing platform or the associated software that runs on the containerized cloud-computing platform, such as onboarding, deployment, or compliance. For instance, security issues related to user permissions may be categorized under a compliance-based recommendation category and prioritized based on the relative severity of the security issues. Additionally other security issues related to cloud security may be categorized under cloud security-based recommendation category and may be prioritized based on the relative severity of the cloud security issues.

This approach optimizes presentation of numerous security issues by categorizing the security issues based on their security type and prioritizes the security issues within each recommendation category such that a user may efficiently choose groups of security issues to remedy based on the recommendation category and relative severity of the security issues within a chosen category. In addition, even if different aspects of the account or associated software might be associated with different properties or considerations, such as different approaches of evaluating the severity of security issues or managing dependencies among security issues, the approach taken by the security management system can be applied in the same manner to security issues concerning different aspects. Therefore, this approach eliminates any need to perform category-specific processing and reducing computing overhead. This approach also enables users to study and prioritize security issues from a uniform user interface, and increases usability of the security management system.

The security management system improves security monitoring and remediation by dynamically prioritizing security issues based on their risk level and based on a requesting user's scope. For example, if a requesting user administrator only has permissions to access certain customer accounts and components, then the security management system prioritizes and presents security issues relevant to those customer accounts and components. This approach optimizes the requesting user's experience by only providing relevant security information that may be acted upon.

2.0 STRUCTURAL OVERVIEW

In some embodiments, software applications are deployed into managed software containers. For instance, an application may be packaged as a deliverable image that may be loaded and executed in multiple instances of a software container. A software container provides a portable execution environment that may insulate an application from some aspects of a physical computer that hosts the container. Multiple instances of the same application in multiple container instances may provide scaling for increased throughput, handling spikes in application demand, redundancy for high availability, and hardware independence for vertical scaling. A software container may be deployed within a virtual machine, a virtual operating system, or any other infrastructure for managed execution of applications. An application can be a containerized application or a host application, and an application herein may also be referred to as a clustered application or a distributed application. A software container herein may be referred to as simply a container.

In some embodiments, multiple instances of the same or different software containers are managed by a container cluster framework for administering multiple instances of a same or different distributed application. A cluster may represent a set of nodes implemented to run containerized applications. Nodes may represent a machine, either a physical machine, such as a server computer, or a virtual machine. Nodes maintain local daemons and/or services configured to run pods. A namespace may represent a group of objects identified for a particular purpose or task. For example, a "human resources" namespace may represent all objects that belong to the business group "human resources" of the customer-host environment. A deployment may represent an object that manages replica sets and provides declarative updates to pods. A replica set may represent an object that ensures that there is a specified number of pods running at any given time. A pod is a deployable object that may represent an instance of a running process managed by a Kubernetes framework. A pod may contain one or more containers. The Kubernetes framework is an open-source platform for managing containerized applications and services. Embodiments are not limited to only using Kubernetes, other embodiments may implement any type of deployment framework for a distributed system.

Security issues of distributed applications, containers for the applications, and hardware used by the applications may be monitored. In various embodiments, various combinations of monitoring infrastructure that provide discovered and monitored data may include the container cluster framework, the application itself, and dedicated monitoring services and agents.

FIG. 1 is a diagram illustrating an example of a deployed customer-host environment and a security management system implemented to monitor various aspects of the deployed customer-host environment. System 100 contains a security management system 110, a customer-host environment 120, and a user device 140 communicatively coupled via network 105. In an embodiment, the customer-host environment 120 represents an execution environment for client applications. The customer-host environment 120 may include one or more host computers running one or more containerized client applications. The customer-host environment 120 may include one or more client agents implemented to collect security metrics about the customer-host environment 120 and provide the security metrics to the security management system 110. The security metrics may indicate any type of compliance anomalies and potential and ongoing threats to the customer-host environment 120. The security metrics may include, but are not limited to, compliance risks, cloud security issues, vulnerabilities or violations associated with containers, hosts, and applications, customer-host setup issues, and any other potential or ongoing risk associated with the customer-host environment 120. In an embodiment, the security management system 110, the customer-host environment 120, and the user device 140 may be implemented in the same clustered environment, running on different nodes within the clustered environment.

FIG. 1 depicts the customer-host environment 120 with nodes 121, 122, 123 and control plane 124. Nodes 121, 122, 123 may represent a set of worker machines that are configured to run containerized applications. Control plane 124 represents an entity configured to manage the nodes 121, 122, and 123. In some embodiments, control plane 124 may be configured to execute a service that runs on multiple computing devices. An example of control plane 124 may include Kubernetes.

In an embodiment, the security management system 110 represents a system for collecting, categorizing, prioritizing, and presenting security events based on the type of security issue. A security event may represent an event related to a specific security issue. A security issue may be any type of issue that may need to be remedied, such as non-compliant permissions or roles associated with an account, non-compliant configurations related to cloud security, or any other issue related to security and security monitoring of a customer environment. Potential security issues may be identified when values for security metrics are outside of an acceptable range. For example, user accounts may be required to change their passwords every month and a particular security metric may be used to measure the duration between changing passwords for accounts. If the particular security metric indicates that a user account has not changed their password in over a month, then a security event may be generated that contains the particular security metric and other attributes for identifying the particular account that has the overdue password.

The security management system 110 provides recommendations for remedying the security issues. For example, the security management system 110 may collect security issues related to user policies and present those security issues to a user via a graphical user interface. The security management system 110 may provide options for remedying the security issues such as automated scripts or instructions from modifying user policies to resolve the specific security issue. In an embodiment, the security management system 110 may prioritize identified security issues based on the type of security issue and its impact on the customer-host environment 120.

User device 140 represents a computing device, used by a user, to view the security issues collected by the security management system 110 and to perform various steps to resolve the security issues. In an embodiment, user device 140 may be configured to implement a user interface for viewing the security issues and performing remediation tasks for correcting the security issues. The user device 140 may be programmed to communicate with the security management system 110 via Application Programming Interfaces (APIs) specific to the security management system 110. In an embodiment, the user device 140 may represent any type of computing device including, but not limited to, a laptop, a desktop, a tablet, a smartphone, and any other computing device that implements security management system 110 specific APIs.

Each of the customer-host environment 120, security management system 110, and user device 140 are communicatively coupled to each other via network 105. In an embodiment, the network 105 facilitates the exchange of communication and collaboration of data between each of the customer-host environment 120, security management system 110, and user device 140. The network 105 may be any type of network that provides communications, exchanges information, and/or facilitates the exchange of data between the customer-host environment 120, security management system 110, and user device 140. For example, the network 105 may represent one or more local area networks (LANs), wide area networks (WANs), metropolitan area networks (MANs), global interconnected internetworks, such as the public internet, public switched telephone networks ("PSTN"), or any other suitable connections or combinations thereof that enable communication among the customer-host environment 120, the security management system 110, and the user device 140. Each such network 105 uses or executes stored programs that implement internetworking protocols according to standards such as the Open Systems Interconnect (OSI) multi-layer networking model, including but not limited to Transmission Control Protocol (TCP) or User Datagram Protocol (UDP), Internet Protocol (IP), Hypertext Transfer Protocol (HTTP), and so forth. All computers described herein are configured to connect to the network 105 and the disclosure presumes that all elements of FIG. 1 are communicatively coupled via network 105.

3.0 FUNCTIONAL DESCRIPTIONS

Figure 2:
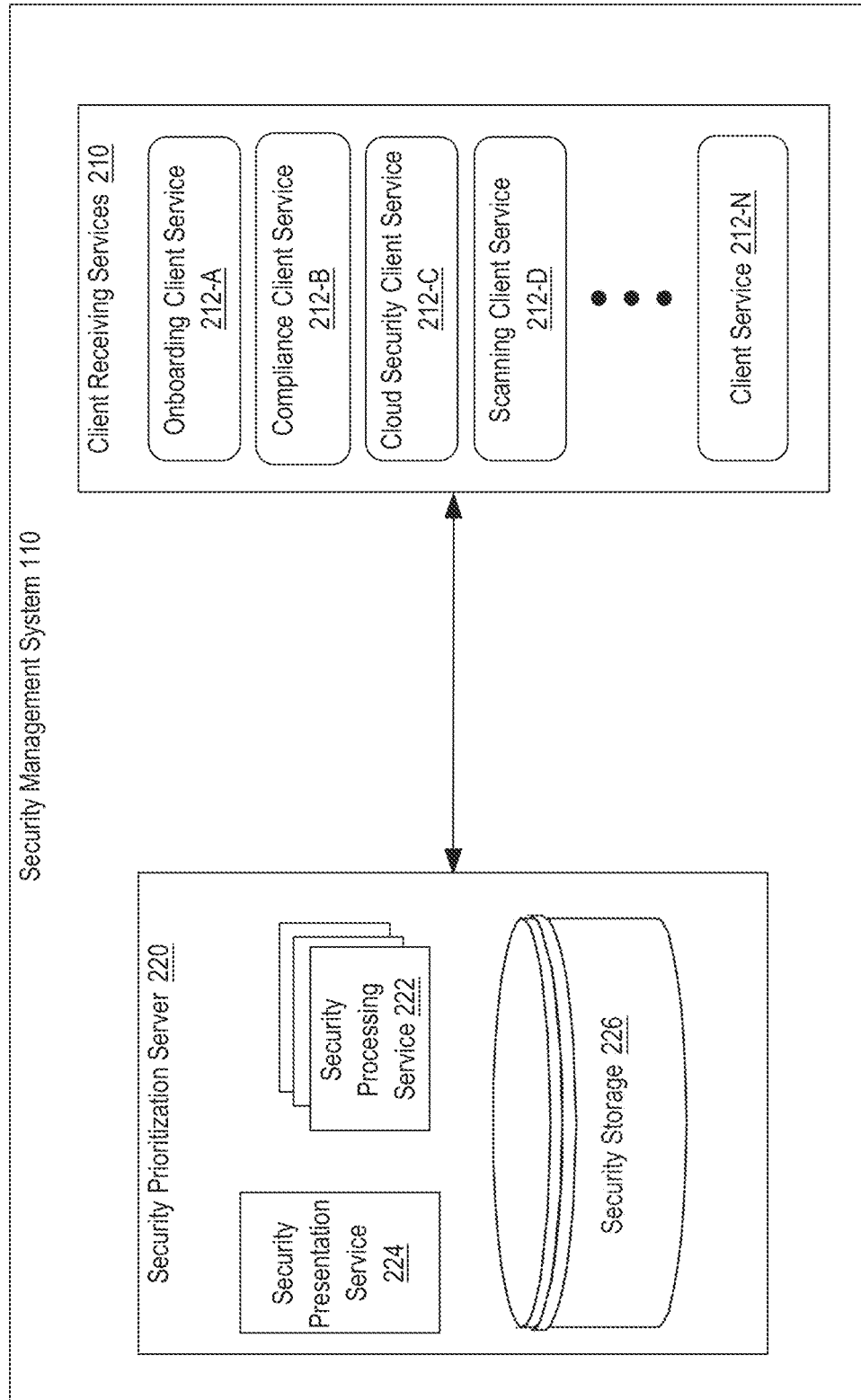
FIG. 2 illustrates functional components of the security management system, in an embodiment.

FIG. 2 illustrates functional components of the security management system, in an embodiment. In an embodiment, the security management system 110 is programmed to store sets of instruction modules which, when executed by one or more processors, perform various functions or services related to collecting, aggregating, and prioritizing different security metrics from multiple sources and storing the aggregated security metrics in persistent storage for later retrieval. In FIG. 2, the security management system 110 is configured with client receiving services 210 and a security prioritization server 220. The security management system 110 depicted in FIG. 2 represents just one illustrative example of the security management system 110 and is not intended to be limited to having only the services depicted in FIG. 2. For instance, the security management system 110 may include fewer or additional services and modules not currently shown in FIG. 2.

3.1 Client Receiving Services

In an embodiment, the client receiving services 210 includes multiple client services implemented to receive finding messages that contain data related to potential security issues within the customer-host environment 120, as further discussed in the next section. The finding messages are provided by a plurality of agents deployed within the customer-host environment 120. The data within a finding message may be referred to as a finding, where the finding represents a potential security issue discovered by an agent. Potential security issues may cover various topics including, but not limited to, compliance issues, cloud security issues, issues resulting from to image scans, such as container images, issues with monitoring setup configurations of the customer-host environment, and any other issue related to security of the customer-host environment 120. In an embodiment, finding messages received from the plurality of agents may contain attributes describing the problem, a computer resource affected by the problem, a timestamp referring to when the problem was detected, and any other attributes that may be used to help quantify the severity of the problem, including the scope of the problem resolution. For example, a finding message received from the agent may specify the problem as an admin user account not having multi-factor authentication (MFA) enabled. The resource for the finding message would be the computer account of the admin user that does not have MFA enabled, and the timestamp associated with the finding message would correspond to when it was detected that the admin user account does not have MFA enabled. Additional attributes in the finding message may contain data describing the permissions assigned to the admin user account, the groups the admin user account may belong to, the frequency in which the admin user account is rotating access keys and/or passwords, and any other security measures tracked by services managing the security events. These additional attributes may be used to determine the level of severity of the security issue with respect to the admin user account.

In an embodiment, the client receiving services 210 contains specific client services tailored to the different types of finding messages that may be identified within the customer-host environment 120. The client receiving services 210 contains an onboarding client service 212-A, a compliance client service 212-B, a cloud security client service 212-C, a scanning client service 212-D, and any other client service represented by client service 212-N. Each of the client services 212-A-212-N, are configured to receive finding messages that describe the identified security issue and assign a risk level to each security issue. In an embodiment, upon assigning a risk level to a security issue, the client services 212-A-212-N may generate a security event to include all of the attributes from the finding message and a new attribute representing the assigned risk level for that security issue. The security events generated are then sent to the security prioritization server 220 for categorization based upon a recommendation for remediating the security issue.

In an embodiment, the onboarding client service 212-A represents a client receiving service implemented to receive finding messages related to setting up and configuring the customer-host environment 120 and the security monitoring therefor. In this context, the finding messages and their corresponding security issues may represent setup and configuration tasks that need to be performed in order for the security management system 110 to collect, categorize, and prioritize any future security issues related to the customer-host environment 120. For example, if the customer-host environment 120 is to contain a Kubernetes deployment, then the onboarding client service 212-A may be implemented to send configuration information related to the Kubernetes deployment to the security management system 110 for monitoring security. The configuration information may refer to information that may be used to monitor the Kubernetes deployment such as IP addresses and ports for the Kubernetes deployment. The configuration information is needed by the security management system 110 in order to prioritize security issues in various components of the customer-host environment 120 for potential security issues. Upon receiving finding messages from agents, the onboarding client service 212-A may generate a security event that contains attributes describing the problem, the resource affected by the problem, a timestamp, and a risk score describing the severity of the problem. For example, if the problem identified is that the customer-host environment 120 does not have a notification channel set up, the onboarding client service 212-A may generate a security event that contains the following attributes: the problem identified as no notification channel selected, the resource as the entire customer-host environment 120, and a timestamp referring to when the issue was detected, with a risk score specifying a level of severity associated with not having a notification channel selected. The onboarding client service 212-A is configured to send the generated security event to the security prioritization server 220. For the onboarding, each category often represents a single configuration task to be performed and no inter-category prioritization is necessary. However, different categories under onboarding may still be prioritized to indicate an order in which the configuration tasks need to be performed based on predefined dependency information, for example.

In an embodiment, the compliance client service 212-B represents a client receiving service implemented to receive compliance-based finding messages for the customer-host environment 120. Examples of compliance-based finding messages include, but are not limited to, security measures not enabled for user accounts, inactive roles associated with user accounts, unused policies, policies that have excessive permissions, roles that have excessive permissions, user accounts that have failed to rotate their access keys in a timely manner, user accounts that have failed to rotate their passwords in a timely manner, or any other security issue related to compliance with policies governing user accounts, user account groups, or other entities. The compliance client service 212-B generates security events that contain attributes describing the problem, the resource affected by the problem, a timestamp, and a risk score attribute describing the severity of the problem. For instance, if the problem is that a user does not have MFA enabled, then the security event would contain attributes specifying the problem as no MFA enabled, the resource as the user who does not have MFA enabled, the timestamp referring to the time when the system discovered that MFA was not enabled, a risk score describing the level of risk associated with the user not having MFA enabled, and any other attributes pertinent to the issue. The compliance client service 212-B sends generated security events to the security prioritization server 220.

In an embodiment, the cloud security client service 212-C represents a client receiving service implemented to receive finding messages related to cloud security of the customer-host environment 120. Examples of cloud-based finding messages include security issues and vulnerabilities associated with cloud accounts and services, such as Amazon Web Services (AWS). The cloud security client service 212-C generates security events that include a description of a problem, a resource, a timestamp, and a risk score associated with the cloud security issue identified. The cloud security client service 212-C sends the generated security events to the security prioritization server 220.

In an embodiment, the scanning client service 212-D represents a client receiving service implemented to receive finding messages arising from scanning images of containers for vulnerabilities, license violations, and any other potential security issues associated with container images. The scanning client service 212-D generates security events that include a problem, a resource, a timestamp, and a risk score associated with the scan issue identified. The scanning client service 212-D sends the generated security events to the security prioritization server 220.

In an embodiment, each of the client services 212-A-212-N are configured to receive finding messages from an agent, process the finding messages and generate security events that include attributes describing the type of security issue as well as an associated risk score for the security issue. The security events are then sent to the security prioritization server 220.

3.2 Security Events

A security event represents a single finding of a security issue within the customer-host environment 120. Security events generated by the client services 212-A-212-N contain several attributes describing the security issue, the impacted resources, a relative risk score associated with the security issue, and any other attributes relevant to describing the security issue.

In an embodiment, a risk score represents the relative severity of the security event and is based upon a several factors including, but not limited to, a number of vulnerabilities associated with the affected resource, a number of computer assets affected by the security issue, the age of the security issue, a level of exploitability associated with the security issue, type of attack vector, a number of steps to remediate the security issue, and any other attributes associated with the security event. The number of assets affected by the security event refers to quantifying how many assets may be affected by the security event. For example, if the security event refers to an out-of-date virtual machine (VM) image running within the customer-host environment 120, then the assets affected by the out-of-date VM may include any downstream assets such as images and/or hosts that interact with the out-of-date VM. The severity of the vulnerability may refer to how severe the security issue is, if exploited. For instance, if the security event is related to confidential data vs. non-confidential data, then the severity of the vulnerability may be greater if it involves confidential data versus if it involves non-confidential data. In another example, the severity of the vulnerability may be greater if the resources affected by the security issue may cause a system-wide delay or a system-wide outage. In an embodiment, the severity of the vulnerability may be quantified using a vulnerability score. The vulnerability score may be based on a 1-to-10 scale where 1 represents the lowest amount of vulnerability and 10 represents the highest amount of vulnerability. Examples are not limited to a 1-to-10 scale and may use any other type of scaling and scaling factor. The age of the security issue refers to how long the security issue has existed. For example, if the security event represents an admin user account not updating their password in a timely manner, then the risk score associated with the security event may be higher if the admin user account has not updated their password in over a year versus if the admin user account has not updated their password in over a week. The level of exploitability associated with the security event refers to how exploitable the security event may be. For instance, if the security event has a small scope that is not publicly accessible, then the risk score may be less than if the security event has a larger scope and is publicly accessible. The attack vector refers to a path or means by which an attacker may gain access to the customer-host environment 120. For example, if the security event describes a security issue that is behind a firewall, then the security event may have a lower attack vector than another security issue that may not be behind a firewall or other security measures.

In an embodiment, risk scores for security events may also factor in a remediation path for fixing the security issue specified in the security event. The remediation path refers to the steps needed to be performed in order to fix the security issue highlighted in the security event. For example, if the security event is for user A not having MFA enabled, then the remediation path may be the steps for enabling MFA for user A. In this example, the remediation path is relatively straightforward, enabling MFA, and would not likely increase the risk score for this security event. However, if the security event was related to Kubernetes not having admission controller policies enabled, then the remediation path would be to create and assign admission controller policies for Kubernetes. This remediation path would require several steps to create the admission controller policies and assign the created policies. These remediation steps would likely increase the overall risk score for this security event. In another example, the remediation path may include the number of infrastructure as code (IaC) files that need to be updated in order to fix a security issue. IaC files may represent machine-readable definition files that are used to configure physical hardware, such as bare-metal servers, as well as virtual machines. If the number of updates to one or more IaC files includes simply updating values in the IaC files then the overall risk score associated with the security event may be lower than if the IaC files require more sophisticated updates including, but not limited to, adding one or more configuration options to the IaC files.

In an embodiment, risk scores may be calculated based on a value associated with the level of vulnerability multiplied by the sum of affected scopes. The following calculation provides one example for calculating a risk score as:

Risk score=(vulnerability score)*sum(Affected assets value)

Where the vulnerability score represents a quantifiable value for the level of vulnerability and the affected assets value represents a quantifiable value for the number of assets affected by the security issue. For example, if security event A has a vulnerability score of 10 and is affecting one scope valued at 1000 where the scope value of 1000 represents the size of the scope, then the calculated risk score would be 10,000 (10*1000). In another example where the vulnerability score is 10 and there are 3 scopes, each having an affected scope value of 1, the calculated risk score would be 30 (10*(3*1)). In yet another example, the security event may have a vulnerability score of 8, affecting 100 scopes each valued at 50. The calculated risk score would equal 40,000 (8*(100*50)). Thus, the overall risk score is affected by the level of vulnerability associated with the security event and the number of scopes affected multiplied by the associated scope value.

As discussed, calculation of the risk score may be specific to the type and origin of the security event. In one example, risk scores for security events identifying critical excessive permissions associated with Cloud Infrastructure Entitlements Management (CIEM) may be calculated using the following algorithm:

Risk Score=(#of Critical permissions unused)

*(sum(UserN*UserNWeight)*UserWeight)

*(Sum(ResourceN*ResourceNWeight)

*(ResourceWeight)

where UserN represents a specific user account affected by the security issue. UserNWeight refers to a specific weighted value calculated for UserN that is based on user-specific attributes associated with UserN. UserWeight refers to a general weight value assigned to users. ResourceN refers to the specific resource associated with the security event. ResourceNWeight refers to a specific weighted value calculated for resourceN. ResourceWeight refers to a general weight value assigned to resources.

In an embodiment, the UserNWeight may be calculated as follows:

UserNWeight={if(userN contains:

(RootUser)→UserNWeight+10

(Admin)→UserNWeight+8

(Inactive)→UserNWeight+7

(NoMFA)→UserNWeight+6

(AccessKeysNotRotated)→UserNWeight+5

(MultipleAccessKeysActive)→UserNWeight+5

(PasswordNotChanged)→UserNWeight+5

(PasswordNotLong)→UserNWeight+1

}else(=1)

UserWeight=100 where the value of UserNWeight increases depending on whether UserN is a RootUser, an Admin user, is an inactive account, does not have MFA enabled, has not rotated access keys, has multiple access keys active, has not changed their password, or does not have a long enough password. If UserN has one or more of the listed attributes then the UserNWeight is increased by the value specified. If however, UserN does not have any of the listed attributes, then the UserNWeight value is set to 1. The UserWeight value for this algorithm is set to 100. In other examples the UserWeight value may be more or less than 100.

In an embodiment, the ResourceNWeight may be calculated as follows:

ResourceNWeight={if(resourceN.type=S3){ if(resourceN.contains{

(PublicBucket)→ResourceNWeight+10

(CrossAccount)→ResourceNWeight+10

(NoDataEncryption)→ResourceNWeight+5

(NoSSLEncyrption)→ResourceNWeight+5

(Inactive)→ResourceNWeight+3

}

}else if(resourceN.type=EC2){ if(resourceN.contains{

(Public)→ResourceNWeight+10

(Inactive)→ResourceNWeight+3

}

}else{=1}

ResourceWeight=10

Where the value of the ResourceNWeight is dependent on whether the resource type is either Simple Storage Service (S3), Elastic Compute Cloud (EC2), or another service. If the resource type is S3, then the ResourceNWeight value is dependent upon whether the resource has a PublicBucket, allows CrossAccount access, does not have DataEncryption, does not have SSLEncryption, and is inactive. If the resource type is EC2, then the ResourceNWeight value is dependent upon whether the resource is Public and whether the resource is Inactive. The ResourceWeight value for this algorithm is set to 10. In other examples the ResourceWeight value may be more or less than 10.

In an embodiment, security events may include additional attributes that may be used to help further prioritize the security events. In one such example, compliance-based security events may include an "Excessive Risk Score" that quantifies whether a user has an excessive risk based on unused permissions or roles. For example, if UserA has a risk score of 16 that is primarily based on UserA being a root user and not having MFA enabled, the user may also have an excessive risk associated with a number of unused roles. The security event may quantify this excessive risk by calculating the excessive risk score as 20 based on three previously granted but unused roles by UserA. The excessive risk score, and any other attributes, may be used to further prioritize security issues. For instance, if two security issues have the same risk score but different excessive risk scores, then the security issue with the higher excessive risk score may be given higher priority than the security issue with a lower excessive risk score.

3.3 Security Prioritization Server

In an embodiment, the security prioritization server 220 is implemented to receive security events, categorize and prioritize the security events based on the type of security issue and their corresponding risk scores, and present the categorized security events to users using a graphical user interface. Referring to FIG. 2, the security prioritization server 220 comprises a security processing service 222, a security presentation service 224, and security storage 226.

3.3.1 Security Event Processing

In an embodiment, the security processing service 222 is implemented to receive security events from the client receiving services 210, process the security events, and categorize the security events based on the type of security issue specified in the security event. In an embodiment, the security processing service 222 implements a messaging queue to receive security events from the client receiving services 210. For example, the security processing service 222 may implement a Neural Atomic Transport System (NATS) messaging queue to receive security events from the client receiving services 210. The NATS queue is an open-source, high-performance, cloud native messaging system that implements a highly scalable publish-subscribe distribution model. However, the security processing service 222 is not limited to only implementing a NATS messaging queue. In other implementations, the security processing service 222 may implement any other commercial or private message service. In certain embodiments, the security processing service 222 is programmed to track the status of each security event. For example, when the security event is received and entered into a queue, it can initially have a pending status. When the security event is dequeued and categorized, is can have a "processed" status. When the security event is presented to a user device as part of a recommendation category, it can have a "viewed" status. When the security event is fixed in response to the viewing or otherwise, it can have a "resolved" status. A security event may be resolved before being presented to a user device, for example, and it would not ever have the viewed status. The security processing service 222 can be programmed to further maintain a history for each security event and enable further presentation or analysis of these histories.

In an embodiment, upon receiving the security events, the security processing service 222 may store the security events in security storage 226. The security storage 226 may represent a storage device implemented to store security events. By persisting the security events in the security storage 226, the security processing service 222 may retrieve events for later categorization, prioritization, and presentation by the security presentation service 224.

The security processing service 222 is implemented to categorize security events based on the type of recommendation needed to fix the security issue. In an embodiment, the security processing service 222 identifies the type of recommendation needed to fix the security issue from the security event attributes that specify the problem. For example, if a particular security event specifies the problem as "no MFA enabled" then the security processing service 222 may determine that the particular security event should be grouped into a recommendation category called "Enable MFA".

In another embodiment, categorizing security events may be based on multiple attributes in the security event. For instance, the security processing service 222 may analyze the attributes specifying the problem as well as attributes specifying the resources affected by the problem to determine where to categorize the security event based on various mapping rules, as further discussed below. For example, if a specific security event specifies the problem as "Unused policies" and the affected resource as digital objects representing "Policy with no users", then the security processing service 222 may determine that the specific security event should be grouped into a recommendation category called "Reduce Risk in Policies". In yet another embodiment, the security processing service 222 may analyze additional attributes that specify the origin of the security event. For example, if the security event was received from the compliance client service 212-B, then the security processing service 222 may use attributes specifying the problem, the resource, and the origin of the security event to categorize the security event to the appropriate recommendation category. Other embodiments may use more or less attributes from the security events to correctly categorize the events into the appropriate recommendation categories.

In an embodiment, the security processing service 222 may maintain a mapping between security event types and corresponding recommendation categories in order to correctly categorize incoming security events. The recommendation categories may be based on the source of the security events. For example, security events originating from the compliance client service 212-B represent security issues identified by a Compliance Monitoring group. Security events originating from the onboarding client service 212-A represent issues associated with setup and configuration of the customer-host environment 120 and are defined by an Onboarding group. Security events originating from the cloud security client service 212-C represent security issues identified by a Cloud Security Monitoring group. Security events originating from the scanning client service 212-D represent security issues identified by the Scanning group. In this context, groups, such as the Compliance Monitoring Group, may refer to a set of modules and/or services configured to define security types associated with different security issues. Mapping rules that map various security events to different recommendations may be provided by the various monitoring groups such as the Compliance Monitoring group, the Cloud Security Monitoring group, a Scanning group, an Onboarding group, and any other group tasked to determine which security issues to monitor and remedy. In an embodiment, the mapping rules may specify identifiers, tags, and other attributes within the security event that may be used to identify the type of security event and to which recommendation category the security event should be assigned. For example, the mapping rules may specify a recommendation of "Remove Inactive Users" that maps to security events that identify the problem as "Inactive Users for customer". In another example, a recommendation of "Remove Inactive Roles" may map to security events that identify the problem as "Inactive Roles for customer".

The following table specifies a sample mapping of recommendations to their corresponding security events:

| Recommendation | Problem | Source of Security Event |
| --- | --- | --- |
| Remove Inactive Users | At least 1 inactive user account found | Compliance |
| Remove Inactive Roles | At least 1 inactive role found | Compliance |
| Enable MFA | Users accounts without MFA found | Compliance |
| Upgrade VM Image | Incompatible Image version | Scanning |
| Connect Kubernetes Cluster | Detected Unprotected Kubernetes Cluster | Onboarding |
| Enable S3 Access Logging | S3 logging not enabled | Cloud Security |

The above mapping table may be used by the security processing service 222 to identify security events and map each security event to a recommendation category. The above mapping table is just an illustrative example. Other examples may contain more or fewer columns and may rely on more attributes to determine the recommendation categories for incoming security events. In other embodiments, machine learning methods can be used to automatically select relevant attributes and determine recommendation categories based on those attributes.

In an embodiment, recommendation categories may be further classified based on a topic. A topic may represent overall types of problems and remediations for the recommendation categories. For example, recommendations for fixing compliance-based issues may be classified into a "Compliance" topic. Recommendations for fixing setup and configuration-based issues may be classified into a "Setup" topic. Topics may be used to selectively filter recommendations and security events based on the type of problem and recommendation needed. For example, if a user wishes to view all recommendations related to configuration and setup issues, the security processing service 222 may filter recommendation categories based on the "Setup" topic. The topic could simply correspond to the sources of the security events or may be determined based on other attributes of the security events.

In an embodiment, the security processing service 222 may perform steps to categorize and prioritize security events into recommendation categories on-demand. For example, upon receiving a request from a user to view recommendations and security issues, the security processing service 222 may retrieve from the security storage 226 the pending security events, categorize the security events into their appropriate recommendation categories, and prioritize the security events and their corresponding recommendation categories. The categorized security events and the recommendation categories may then be provided to the security presentation service 224 for presentation to the user in priority order, via user device 140.

The security processing service 222 may take into account permissions of a requesting user when providing categorized security events and corresponding recommendation categories to the security presentation service 224. By providing a customized view of recommendation categories and security issues that are only applicable to the requesting user, the view of recommendations is not cluttered with recommendations that either do not pertain to the requesting user or recommendations that the requesting user is not authorized to remedy. In an embodiment, prior to categorizing security events, the security processing service 222 filters security events based on the permissions associated with a requesting user. The security processing service 222 then categorizes the security events, which the requesting user has permissions to view or fix, into their corresponding recommendation categories. Data related to these security events and their corresponding recommendation categories are then provided to the security presentation service 224 for presentation to the requesting user, as further discussed in the subsequent sections. For example, if a quality assurance (QA) administrator made a request to view all pending security issues, the security processing service 222 would then only categorize the security events that pertain to QA resources. For instance, only "no MFA enabled" security events related to QA users would be categorized and presented to the QA administrator. Other "no MFA enabled" security events related to production accounts or development accounts would not be categorized by the security processing service 222 as the QA administrator would not have permissions to remedy the production or development accounts.

The security processing service 222 may also be configured to process pending security events according to a predetermined schedule or continuously in real time (over predetermined small time increments). In an embodiment, the security processing service 222 may categorize security events into their corresponding recommendation categories as the security events are received from the client receiving services 210. By doing so, the security processing service 222 may improve processing time of requests to view recommendations and security issues. When the security processing service 222 categorizes the security events into recommendation categories, the security processing service 222 would categorize all security events regardless of their scope. The categorized security events may be stored in security storage 226 for later retrieval when a request is received from a requestor. When a request is received from user device 140, the security processing service 222 may determine the permissions of the requestor. Upon determining the permissions of the requestor, the security processing service 222 may then selectively retrieve the security events, and their corresponding recommendation categories, for which the requestor has permissions to view or fix. The security processing service 222 the provides the recommendation categories and the selected security issues to the security presentation service 224.

3.3.2 Recommendation Category Scoring

In some embodiments, the security processing service is programmed to prioritize the recommendation categories for a user account to assist in efficient improvement of the customer-host environment 120. In order to prioritize recommendation categories for presentation, the security processing service 222 is configured to calculate an aggregated risk score for each recommendation category. In an embodiment, the aggregated risk score for a particular recommendation category is based on the security events received during a specific period of time, categorized into the recommendation category, and yet to be fixed. If the recommendation category "Enable MFA" contains 10 security events, then the aggregated risk score for the "Enable MFA" recommendation category may be an aggregation of the risk scores associated with the ten security events. For instance, if each of the ten security events had a risk score of 9.5, then the aggregated risk score for the "Enable MFA" recommendation category would be 95 (9.5 score*10 security events). In this case, sum is the aggregator to take into consideration the number of security events that have been categorized into the recommendation category. Other aggregators, such as average, median, a weighted sum, or product could be used. In some embodiments, security processing service 222 is programmed to prioritize recommendation categories under the same topic based on the aggregated risk scores. In other embodiments, the prioritization is performed over other segmentations of recommendation categories, such recommendation categories with newly received security events during the last hour, or across all recommendation categories.

In an embodiment, when calculating the aggregated risk scores for recommendation categories, the security processing service 222 takes into account the security events that a requestor has authority to view or fix. Using the above example, if the requestor is a QA administrator and only 4 of the 10 security events categorized as "Enable MFA" pertain to QA accounts, then the security processing service 222 would calculate the aggregated risk score as 38 (9.5 score*4 security events). By determining the aggregated risk scores based on a requestor's permissions, prioritization of the recommendation categories are specific to the requesting user.

3.3.3 Security Presentation

In an embodiment, the security presentation service 224 is implemented to provide an interface for requesting users, using user device 140, to view pending security issues grouped in recommendation categories. The interface provided to user device 140 may include one or more graphical user interfaces configured to display prioritized recommendation categories, allow users to drill down into each recommendation category to view the outstanding security issues, and to execute available actions to fix specific security issues.

Figure 3A:
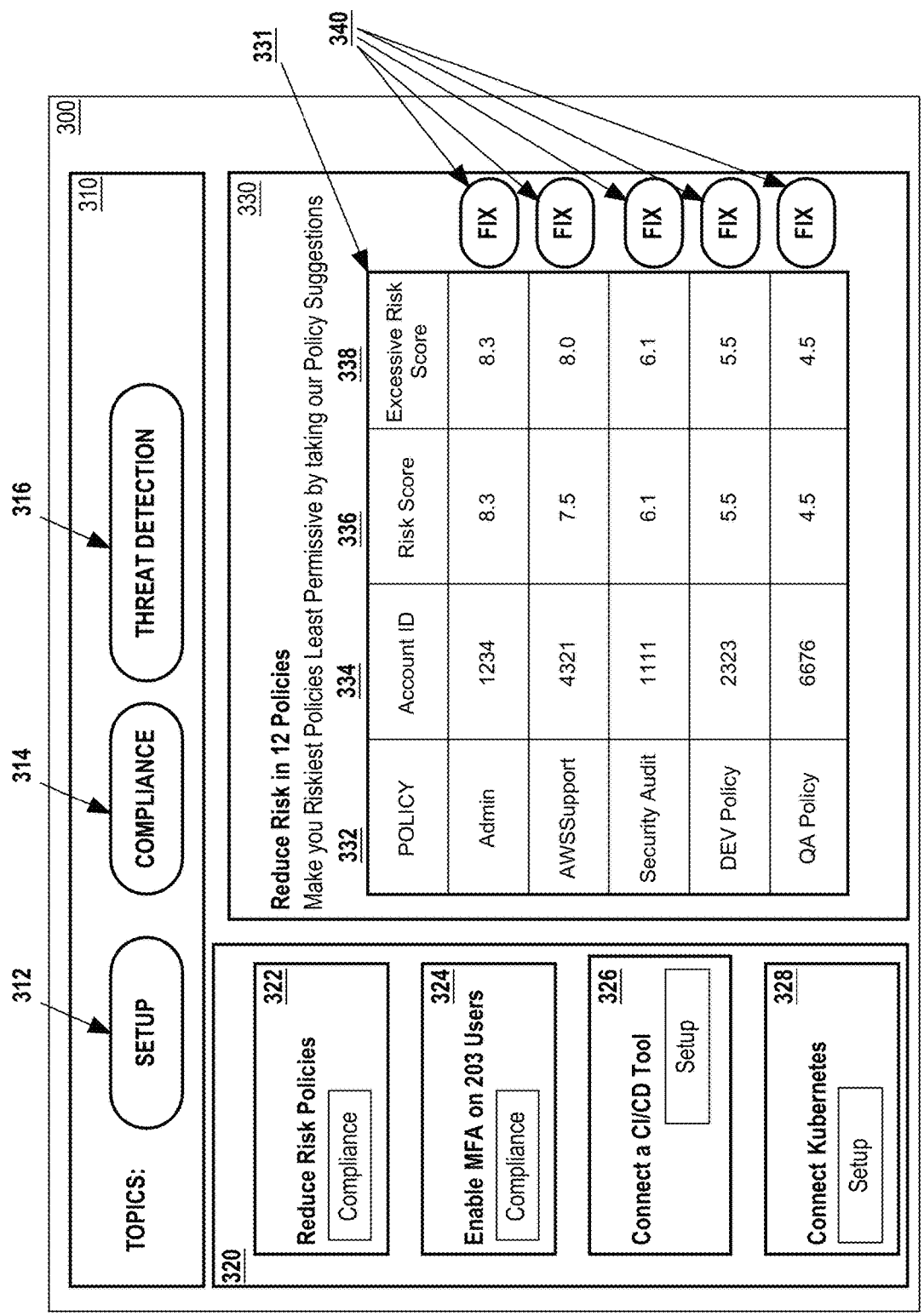
FIG. 3A is an example graphical user interface for displaying recommendation categories and corresponding security issues within a selected recommendation category, in an embodiment.

FIG. 3A is an example graphical user interface for displaying recommendation categories and corresponding security issues within a selected recommendation category. Graphical user interface (GUI) 300 represents a GUI generated by the security presentation service 224 and presented to a requesting user on user device 140. In an embodiment, topics, recommendation categories, and security issues presented in GUI 300 are the recommendation categories and security issues pertaining to the requesting user. For example, only recommendation categories and security issues for which the requesting user has permissions to view or fix are presented. For example, the GUI 300 view for a QA administrator may not show any setup recommendations pertaining to setup and configuration of production deployments, as the production components are outside of the scope of the QA administrator.

GUI 300 contains frames 310, 320, and 330. Frame 310 is a frame that displays topics viewable to the requesting user. As discussed, each topic within frame 310 represents a group of recommendation categories and typically corresponds to a type of client service. Frame 320 contains a list of panels, buttons, or other GUI widgets that represent the recommendation categories. Frame 330 similarly shows a list of security issues for a selected recommendation category. Frame 310 shows three available topic widgets for setup topic 312, compliance topic 314, and threat detection topic 316. When a user selects a topic widget, such as that for setup topic 312, frame 320 may be updated to only show recommendation widgets for recommendation categories that fall within the setup topic For instance, frame 320 would only show widget that represent recommendation widgets 326 and 328. The remaining recommendation category widgets that are not part of the setup topic 312 would be hidden from view.

In an embodiment, frame 310 may selectively display a subset of available topics based on dependencies associated between the available topics. For example, if an admin user for the customer-host environment 120 is still performing steps associated with an onboarding stage, such as initial configuration and setup, then frame 310 may not display topics related to compliance or threat detection as these topics may not yet be relevant to the admin user during the setup process. Viewing various topics and recommendations may be dependent on the admin user completing certain tasks such as configuring and connecting various servers and monitoring services.

Frame 320 contains the list of recommendation categories that include recommendation widgets 322, 324, 326, and 328. Recommendation widgets 322 represents the "Reduce Risk Policies" recommendation category and displays a topic label of Compliance to indicate that it is part of the compliance topic 314. Recommendation widgets 324 represents the "Enable MFA" recommendation category and displays a topic label of Compliance to indicate that it is part of the compliance topic 314. Recommendation widgets 326 represents the "Connect a CI/CD Tool" recommendation category and displays a topic label of Setup to indicate that it is part of the setup topic 312. Recommendation widgets 328 represents the "Connect Kubernetes" recommendation category and displays a topic label of Setup to indicate that it is part of the setup topic 312.

The recommendation widgets in frame 320 are prioritized in descending order within their corresponding topic. Prioritization is based on aggregated risk scores calculated for each recommendation category. In an embodiment, recommendation categories within each specific topic are sorted and prioritized in descending order so that the recommendation category for each topic that has the highest aggregated risk score is presented at the top. For example, recommendation widgets 322 and 324 each belong to the compliance topic 314 and are prioritized where recommendation widget 322 (Reduce Risk Policies) has a higher aggregated risk score than recommendation widget 324 (Enable MFA). Similarly, recommendation widgets 326 and 328 each belong to the setup topic 312 and are prioritized where recommendation widget 326 (Connect a CI/CD Tool) has a higher aggregated risk score than recommendation widget 328 (Connect Kubernetes). In some embodiments, each of the recommendation category widgets can show the aggregated risk score directly or upon further user interaction.

Upon selecting a particular recommendation category widget, the security presentation service 224 displays a list of security issues for the particular recommendation category in frame 330. For example, upon selecting the recommendation widget 322 (Reduce Risk Policies), frame 330 includes a table 331 representing a detailed list of security issues associated with the recommendation widget 322. The security issues displayed are existing security issues identified from security events received by the security prioritization server 220 and for which the requesting user has permissions to view or fix. For example, frame 330 displays twelve security issues respectively affecting twelve policies. Within frame 330, table 331 contains details for each of the security issues. The security issues are ordered in descending order based upon their corresponding risk score. For example, the security issue with the highest risk score is displayed at the top of table 331.

Column 332 displays the policy name for each security issue. Column 334 displays an associated account ID. Column 336 displays the calculated risk scores for each security issue. Column 338 displays an additional excessive risk score calculated for each of the compliance security issues. As discussed previously, the excessive risk score may represent an additional risk calculation based on a level of unused permissions and/or roles associated with the displayed user account. Other types of security issues may have more or less attributes displayed in table 331. In an embodiment, table 331 may be customized to display any available security event attributes. Additionally, table 331 may be resorted based on any of the columns 332-338. In an embodiment, fix button 340 represents an action button for applying a fix to remedy the associated security issue. In this example, selecting the fix button 340 for the Admin policy may trigger one or more actions to reduce the risk associated with the admin policy, for instance the one or more actions may include removing unused permissions that are associated with the admin policy.

In an embodiment, upon selecting a particular recommendation category, the security presentation service 224 makes a request to the security processing service 222 to generate instructions to fix security issues related to security events associated with the particular recommendation category. For example, if the recommendation widget 324 (Enable MFA on 203 Users) is selected, the security processing service 222 generates commands to automatically enable MFA for each of the 203 users. The generated commands are not automatically executed, but may be executed all at once or individually. For example, the user may select the fix button associated with one or more user accounts to enable MFA for those user account. In another embodiment, frame 330 may include a "fix all" button which when selected automatically executes the generated commands to fix all the security issues associated with the recommendation widget 324. In another embodiment, the instructions may be generated and made available to the security presentation service 224 before the selection of any recommendation category. Therefore, in response to a click on a recommendation widget for a recommendation category, for example, the options for fixing the security issues associated with the recommendation category can be displayed without delay. In yet another embodiment, the GUI 300 could automatically refresh periodically or upon user request to show the latest recommendation categories and security issues.

In an embodiment, selecting the fix button 340 may trigger an additional graphical user interface, such as a popup window, which displays the actions about to be performed to remedy the security issue. In one example, the recommendation category may be "Reduce Risk Policies" and selecting the fix button 340 may trigger a popup window that displays suggested changes to user policies and/or roles in order to reduce the current level of risk associated with the user policies and/or roles. In an embodiment, the suggested changes to the user policies and/or roles may be based prior usage and behavior of roles and policies in the customer-host environment 120 over a period of time. The suggested changes may be automatically applied to the relevant cloud resources in the customer-host environment 120 associated with the user policies and/or roles.

In another example, the recommendation category may be related to cloud security violations and selecting the fix button 340 may trigger a popup window that displays recommendation changes configuration parameters in one or more IAC source files. The recommended changes may be automatically applied by selecting an approve button in the popup window that triggers an automatic update to the one or more IAC files. Alternatively, the popup window may display the recommended changes to the one or more IAC files and an option to automatically open a change request, such as a pull request, to inform customer-host environment 120 administrators of the recommended changes, prior to applying the changes to the IAC files.

In another embodiment, selecting the fix button 340 may trigger an additional graphical user interface that displays the actions needed to remedy the security issue that need to be performed manually. In this case, the popup window displayed in response to selecting the fix button 340 may display detailed instructions, such as prepared commands that a user may copy and paste into a terminal window to perform the needed fix.

Figure 3B:
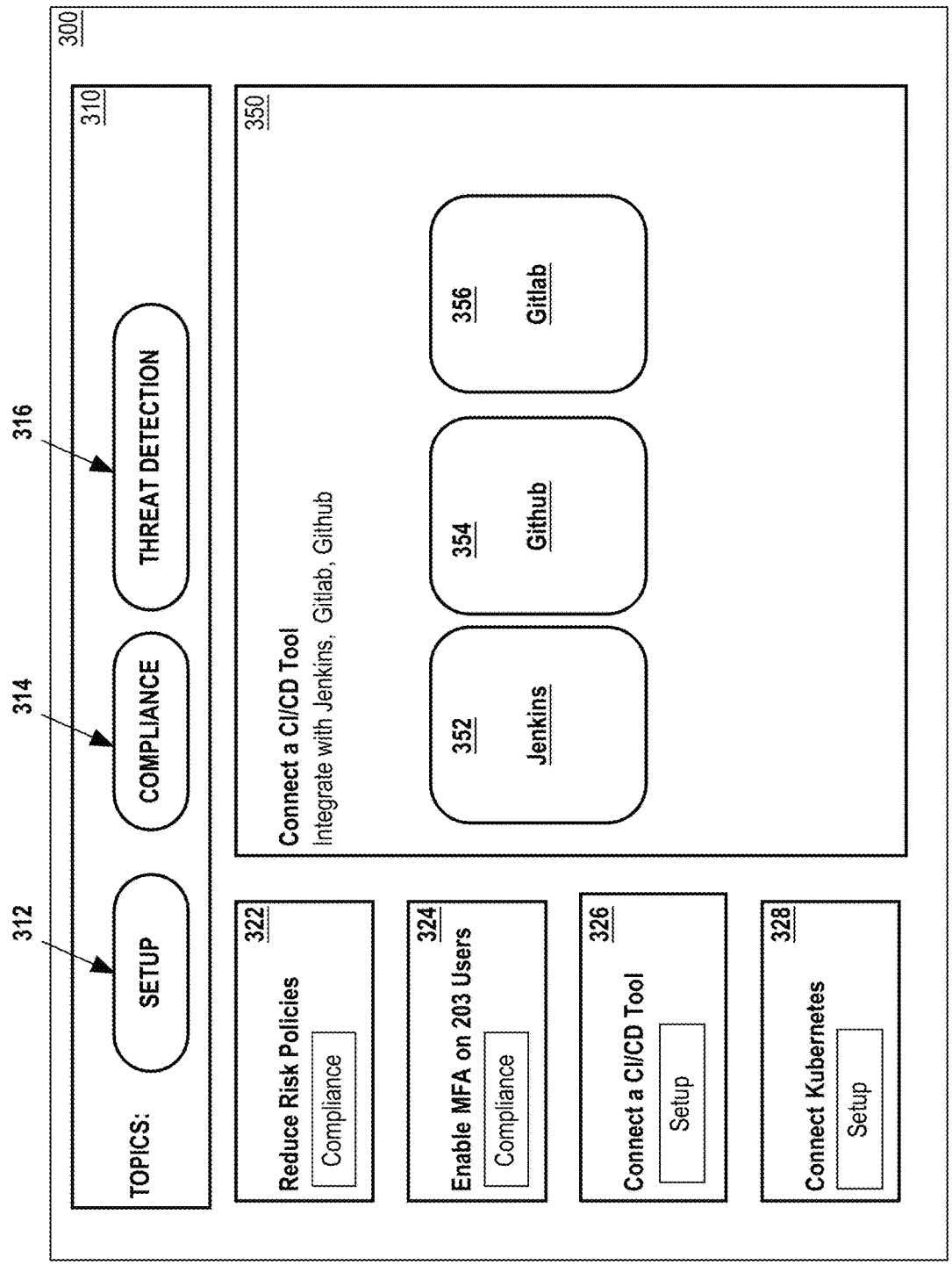
FIG. 3B is an example graphical user interface for displaying recommendation categories and a corresponding interface for remedying a selected security issue, in an embodiment.

FIG. 3B is an example graphical user interface for displaying recommendation categories and a corresponding interface for remedying a selected security issue. GUI 300 contains frames 310, 320, and 350. While frames 310 and 320 are the same as FIG. 3A, frame 350 contains setup information for setting up a Continuous Integration/Continuous Deployment (CI/CD) Tools. Frame 350 is displayed in response to the user selecting recommendation widget 326. Within frame 350, there is a description "Integrate with Jenkins, Gitlab, Github" that describes the options for setting up a CI/CD. Button 352 is programmed to, when selected, initiate a process for connecting to a Jenkins automation tool. Button 354 is programmed to, when selected, initiate a process for connecting to Github. Button 356 is programmed to, when selected, initiate a process for connecting to Gitlab.

In an embodiment, recommendation categories within the setup topic may contain a single security event which represents a specific setup or configuration task that needs to be performed. In this context, since there is only a single security event, which represents a setup or onboarding task, there is no need to prioritize the security events within frame 350. Upon completion of the displayed setup or configuration task, the security presentation service 224 may trigger the display of additional recommendation categories that may have otherwise been hidden. For example, compliance recommendations may have been hidden as initial setups were still pending. Once the initial setup tasks are completed, the compliance recommendations may then be displayed within GUI 300.

4.0 Procedural Overview

Figure 4:
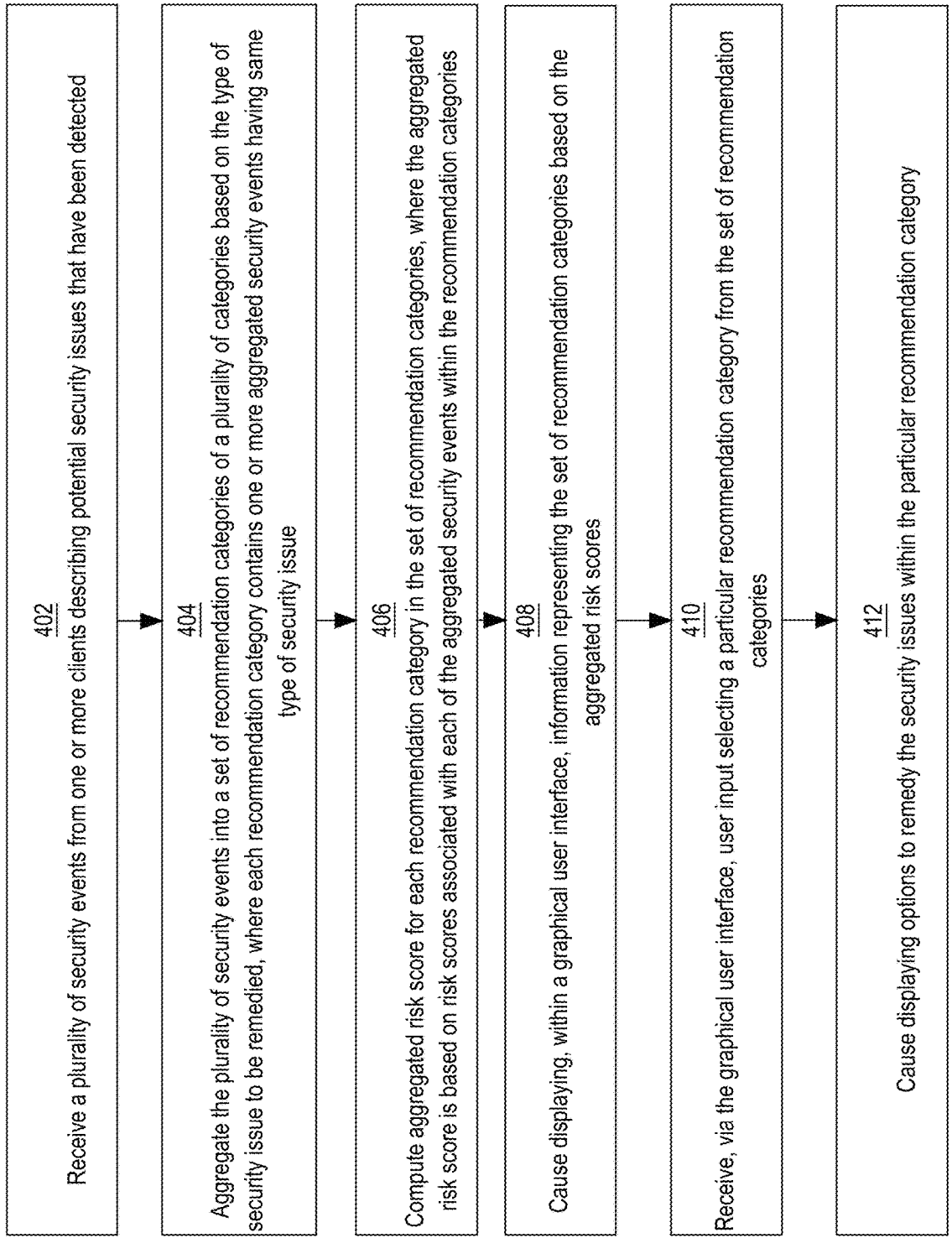
FIG. 4 depicts a flowchart for receiving a plurality of events describing potential security issues to be remedied, categorizing, and prioritizing the events based on the type of security issue, and displaying recommendation categories for remedying the security issues, in an embodiment.

FIG. 4 depicts a flowchart for receiving a plurality of events describing potential security issues to be remedied, categorizing the events based on the type of security issue into recommendation categories, prioritizing the recommendation categories, and causing display of recommendation categories for remedying the security issues. The process described may be performed by a single processor or multiple processors and via a single program or multiple programs. The steps of the process as shown in FIG. 4 may be implemented using processor-executable instructions that are stored in computer memory. For the purposes of providing a clear example, the steps of FIG. 4 are described as being performed by computer programs executing on the security prioritization server 220. For the purposes of clarity, the process described may be performed with more or fewer steps than described in FIG. 4.

At step 402, the security prioritization server 220 receives a plurality of security events from one or more clients describing potential security issues that have been detected. In an embodiment, the security prioritization server 220 receives security events from client receiving services 210. The client receiving services 210 may generate security events that contain one or more attributes describing the type of security issue that has been detected, one or more resources affected by the security issue, and a risk score defining a level of security risk associated with the event. In an embodiment, the risk score calculated may be based on several factors including, but not limited to, a number of resources affected by the security issue, a number of remediation steps needing to be taken to resolve the security issue, a severity of the vulnerability associated with the security issue, the age of the security issue, a level of exploitability associated with the security issue, and any other attributes related to the security issue.

At step 404, the security prioritization server 220 aggregates the plurality of security events into a set of recommended categories of a plurality of categories based on the type of security issue to be remedied. In an embodiment, the security processing service 222 categorizes and aggregates security events from the client receiving services 210 based on attributes specifying the type of security issue to be remedied. In other embodiments, the security processing service 222 may take into account other attributes associated with the security events including, but not limited to, the resources affected by the security issue, the origin of the security event, and any other attribute that may be used to further categorize security events.

In an embodiment, step 404 may be performed in response to a user making a request to view security issues within a graphical user interface. For example, a requesting user, using user device 140, may open GUI 300, causing a request to be made to the security prioritization server 220. The security prioritization server 220 may request the set of recommended categories from the security processing service 222. The security processing service 222 may aggregate security events into the set of recommended categories. The process for aggregating security events into the set of recommended categories may take into account permissions associated with the requesting user account when determining which security events should be included in the aggregation step. For example, if the requesting user account is a developer administrator, then the security events aggregated may only include events related to development deployments, users, roles, and any other resources associated with the customer's development environment. Resources associated with a customer's production or QA environment would not be included in the aggregation and generation of recommendation categories.

At step 406, the security prioritization server 220 computes aggregated risk scores for each recommendation category in the set of recommendation categories, where the aggregated risk scores are based on risk scores associated with each of the aggregated security events within the recommended categories. In an embodiment, the security processing service 222 computes the aggregated risk score for each recommendation category as an aggregated value of the risk scores associated with each security event belonging to the specific recommendation category. For example, if a recommendation category is "Enable MFA" and the recommendation category contains 10 security events, each having a risk score of 5.0, then the aggregated risk score for the "Enable MFA" recommendation category would equal the sum of 5.0*10 security events, which is 50.0.

At step 408, the security prioritization server 220, causes displaying of information representing the set of recommendation categories based on the aggregated risk scores, within a graphical user interface. In an embodiment, the security presentation service 224 causes display of the graphical user interface (GUI 300) on user device 140. GUI 300 includes a list of the recommendation categories prioritized by their corresponding aggregated risk scores grouped by topic. For example, the recommended widgets 322 (Reduce Risk Policies) and 324 (Enable MFA for 203 Users) are part of the compliance topic 314 and are presented in descending order in frame 320 based on their corresponding aggregated risk scores. The recommended widgets 326 (Connect CI/CD Tool) and 328 (Connect Kubernetes) are part of the setup topic 312 and are presented in descending order in frame 320 based on their corresponding aggregated risk scores.

At step 410, the security prioritization server 220, receives, via the graphical user interface, user input selecting a particular recommendation category from the set of recommendation categories. In an embodiment, the security prioritization server 220 receives user input selecting a particular recommendation category from frame 320. For example, the user input may select recommendation widget 322 (Reduce Risk Policies).

At step 412, the security prioritization server 220, causes displaying options to remedy security issues within a particular recommendation category, in response to receiving the user input selecting the particular recommendation category. In an embodiment, the security presentation service 224 makes a request to the security processing service 222 for instruction options to fix security issues related to security events associated with the particular recommendation category. For example, if the recommendation widget 324 (Enable MFA on 203 Users) is selected, the security processing service 222 displays commands to automatically enable MFA for each of the 203 users.

5.0 IMPLEMENTATION EXAMPLE—HARDWARE OVERVIEW

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
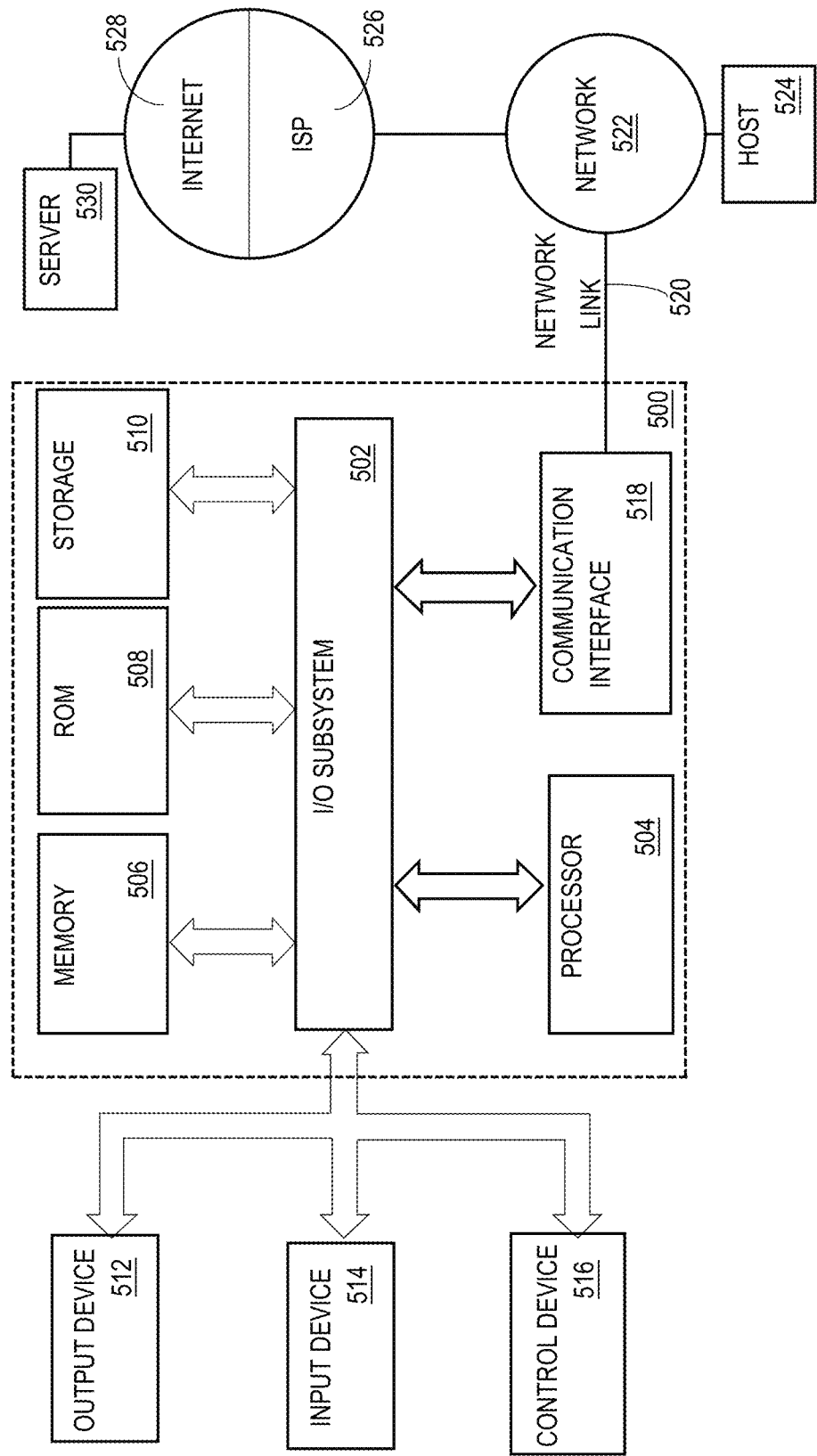
FIG. 5 is a block diagram that illustrates a computer system upon which an embodiment of the invention may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk, optical disk, or solid-state drive is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

6.0 EXTENSIONS AND ALTERNATIVES

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method for prioritizing security issues, comprising:
   receiving, by one or more processors, a plurality of security events, from one or more clients, describing the security issues that have been detected,
   wherein the security issues are related to computer security,
   wherein each of the plurality of security events comprises attributes describing:
      a type of security issue to be remedied,
      one or more resources affected by the security issue, and
      a risk score defining a level of security risk associated with the security issue based on a number of impacted computer resources or an amount of work to remedy the security issue;
   aggregating, by the one or more processors, the plurality of security events into a set of recommendation categories of a plurality of categories based on the type of security issue to be remedied, wherein each recommendation category in the set of recommendation categories contains one or more aggregated security events having same type of security issue;
   computing, by the one or more processors, an aggregated risk score for each recommendation category in the set of recommendation categories, wherein the aggregated risk score for said each recommendation category is based on one or more risk scores associated with the one or more aggregated security events belonging to said each recommendation category, wherein each of the one or more risk scores is defined as being either based on the number of impacted computing resources or the amount of work to remedy the corresponding security issue;
   causing displaying, within a graphical user interface, information representing the set of recommendation categories based on the aggregated risk scores;
   receiving, via the graphical user interface, user input selecting a particular recommendation category from the set of recommendation categories;
   in response to selecting the particular recommendation category, causing displaying options to remedy the security issues within the particular recommendation category.

2. The computer-implemented method of claim 1, wherein aggregating the plurality of security events to generate a set of recommendation categories comprises:
- identifying sets of security events in the plurality of security events based on the type of security issue to be remedied; and
- determining a corresponding recommendation category for each of the sets of security events based on a mapping between a type of security issue and a recommendation category, wherein each recommendation category represents a remediation recommendation comprising one or more steps to remediate the type of security issue.

3. The computer-implemented method of claim 2, wherein identifying the sets of security events in the plurality of security events comprises identifying the sets of security events based on the type of security issue to be remedied and the one or more resources affected by the security issue.

4. The computer-implemented method of claim 3,
- wherein identifying the sets of security events in the plurality of security events, comprises identifying the sets of security events as a subset of security events from the plurality of security events based on access permissions associated with a user account to which the graphical user interface is presented,
- wherein the security events within the subset of security events are accessible to the user account.

5. The computer-implemented method of claim 1, wherein computing aggregated risk scores for each recommendation category in the set of recommendation categories comprises calculating a weighted sum of risk scores associated with each of the security events within the recommended categories.

6. The computer-implemented method of claim 1, wherein causing displaying, within the graphical user interface, information representing the set of recommendation categories comprises:
- ordering the set of recommendation categories based on their corresponding aggregated risk scores; and
- causing displaying, within the graphical user interface, the information representing the set of recommendation categories in descending order.

7. The computer-implemented method of claim 1, further comprising, in response to receiving the user input selecting the particular recommendation category, causing displaying, within the graphical user interface, information regarding particular security events within the particular recommendation category and an option to automatically execute instructions to remedy one or more particular security events of the particular security events within the particular recommendation category.

8. The computer-implemented method of claim 7, wherein causing displaying, within the graphical user interface, information regarding the security events within the particular recommendation category comprises:
- ordering the security events based on their corresponding risk scores; and
- causing displaying, within the graphical user interface, information regarding the security events within the particular recommendation category in descending order and the option to automatically execute instructions to remedy a particular security event of the particular security events within the particular recommendation category.

9. The computer-implemented method of claim 7, further comprising:
- receiving, via the graphical user interface, a selection of the option to automatically execute instructions to remedy a particular security event of the particular security events within the particular recommendation category;
- in response to receiving the user input, causing the particular security event to be remedied by executing the instructions.

10. The computer-implemented method of claim 7,
- wherein a particular security event of the particular security events is related to one or more configuration values specified in one or more infrastructure as code files, and
- wherein the instructions to remedy the particular security event comprises a set of update commands to update configuration values within the one or more infrastructure as code files.

11. The computer-implemented method of claim 1,
- wherein a specific security event of the plurality of security events is related to infrastructure of the computing platform,
- wherein the number of impacted computer resources corresponds to the number of source code files to modify in order to remedy the security issue,
- wherein the amount of work to remedy the security issue corresponds to the amount of updates to be made to the source files in order to remedy the security issue.

12. The computer-implemented method of claim 1, wherein the risk score for each of the plurality of security events is calculated based on a vulnerability attribute score multiplied by a number of resources affected.

13. The computer-implemented method of claim 1, wherein the risk score for each of the plurality of security events is calculated based on a sum of number of affected user accounts multiplied by a corresponding user weight value and a sum of resources affected by the security issue multiplied by a corresponding resource weight value;
- wherein the corresponding user weight value is determined based upon user attributes that include whether a particular user account: is a root user account, is an administrator account, has been inactive for a period of time, does not have multi-factor authentication enabled, has not rotated access keys, has multiple keys active, has not changed a password in a period of time, and does not meet a minimum password length; and
- wherein the corresponding resource weight value is determined based upon type of resource and whether the resource has data encryption enabled, has secure sockets layer encryption enabled, has a public bucket, and allows cross account access.

14. The computer-implemented method of claim 1,
- wherein the information representing the set of recommendation categories comprises one or more associated topics for each recommendation category in the set of recommendation categories,
- wherein the one or more associated topics correspond to one or more aspects of the computing platform, including onboarding, scanning, or compliance, correspond to one or more sources of the security events associated with the recommendation categories, and form super categories of the recommendation categories.

15. The computer-implemented method of claim 1, wherein the particular recommendation category selected is associated with a single onboarding task; and
   wherein the displaying options to remedy the security issues within the particular recommendation category comprises instructions to complete the single onboarding task.

16. The computer-implemented method of claim 1, wherein the particular recommendation category selected is associated with compliance risk policies;
   wherein the displaying options to remedy the security issues within the particular recommendation category comprises suggestions to update user policies and roles to reduce risk based on behavior, roles, or usage of the user policies and roles in a customer environment.

17. One or more non-transitory computer-readable media storing computer program instructions which, when executed by one or more processors, cause:
   receiving a plurality of security events, from one or more clients, describing security issues that have been detected,
   wherein the security issues are related to computer security,
   wherein each of the plurality of security events comprises attributes describing:
   a type of security issue to be remedied,
   one or more resources affected by the security issue, and
   a risk score defining a level of security risk associated with the security issue based on a number of impacted computer resources or an amount of work to remedy the security issue;
   aggregating the plurality of security events into a set of recommendation categories of a plurality of categories based on the type of security issue to be remedied, wherein each recommendation category in the set of recommendation categories contains one or more aggregated security events having same type of security issue;
   computing an aggregated risk score for each recommendation category in the set of recommendation categories, wherein the aggregated risk score for said each recommendation category is based on one or more risk scores associated with the one or more aggregated security events belonging to said each recommendation category, wherein each of the one or more risk scores is defined as being either based on the number of impacted computing resources or the amount of work to remedy the corresponding security issue;
   causing displaying, within a graphical user interface, information representing the set of recommendation categories based on the aggregated risk scores;
   receiving, via the graphical user interface, user input selecting a particular recommendation category from the set of recommendation categories;
   in response to selecting the particular recommendation category, causing displaying options to remedy the security issues within the particular recommendation category.

18. The one or more non-transitory computer-readable media of claim 17, wherein aggregating the plurality of security events to generate a set of recommendation categories comprises:
   identifying sets of security events in the plurality of security events based on the type of security issue to be remedied; and
   determining a corresponding recommendation category for each of the sets of security events based on a mapping between a type of security issue and a recommendation category, wherein each recommendation category represents a remediation recommendation comprising one or more steps to remediate the type of security issue.

19. The one or more non-transitory computer-readable media of claim 17, wherein causing displaying, within the graphical user interface, information representing the set of recommendation categories comprises:
   ordering the set of recommendation categories based on their corresponding aggregated risk scores; and
   causing displaying, within the graphical user interface, the information representing the set of recommendation categories in descending order.

20. A system including at least one processor and memory coupled to the processor, the memory loaded with computer program instructions that, when executed on the at least one processor, cause the at least one processor to carry out a method, comprising:
   receiving a plurality of security events, from one or more clients, describing security issues that have been detected,
   wherein the security issues are related to computer security,
   wherein each of the plurality of security events comprises attributes describing:
   a type of security issue to be remedied,
   one or more resources affected by the security issue, and
   a risk score defining a level of security risk associated with the security issue based on a number of impacted computer resources or an amount of work to remedy the security issue;
   aggregating the plurality of security events into a set of recommendation categories of a plurality of categories based on the type of security issue to be remedied, wherein each recommendation category in the set of recommendation categories contains one or more aggregated security events having same type of security issue;
   computing an aggregated risk score for each recommendation category in the set of recommendation categories, wherein the aggregated risk score for said each recommendation category is based on one or more risk scores associated with the one or more aggregated security events belonging to said each recommendation category, wherein each of the one or more risk scores is defined as being either based on the number of impacted computing resources or the amount of work to remedy the corresponding security issue;
   causing displaying, within a graphical user interface, information representing the set of recommendation categories based on the aggregated risk scores;
   receiving, via the graphical user interface, user input selecting a particular recommendation category from the set of recommendation categories;
   in response to selecting the particular recommendation category, causing displaying options to remedy the security issues within the particular recommendation category.

* * * * *